United States Patent [19]

Mabie, Jr.

[11] 3,892,579

[45] July 1, 1975

[54] ADHESIVE REFRACTORY PROTECTIVE COMPOSITION FOR INVESTMENT CASTING

[75] Inventor: Curtis P. Mabie, Jr., Frederick, Md.

[73] Assignee: American Dental Association, Chicago, Ill.

[22] Filed: Mar. 22, 1973

[21] Appl. No.: 343,856

[52] U.S. Cl. ............... 106/38.3; 106/38.35; 106/57
[51] Int. Cl.² ........................................... B28B 7/34
[58] Field of Search.................. 106/38.3, 38.35, 57

[56] References Cited
UNITED STATES PATENTS

| | | | |
|---|---|---|---|
| 3,232,771 | 2/1966 | Pearce | 106/38.35 |
| 3,537,949 | 11/1970 | Brown et al. | 106/38.3 |
| 3,743,003 | 7/1973 | Brown | 106/38.35 |
| 3,769,044 | 10/1973 | Horton | 106/38.3 |

*Primary Examiner*—Lorenzo B. Hayes
*Attorney, Agent, or Firm*—Molinare, Allegretti, Newitt & Witcoff

[57] ABSTRACT

An adhesive refractory composition useful in investment casting to secure wax or plastic preforms to a pattern, and as a protective coat on the inner surface of a mold. The composition consists of a tacky organic solvent solution of a refractory metal salt (zirconium octotate in methylene chloride) having dispersed therein fine granules of a refractory ceramic material (zircon).

6 Claims, No Drawings

ADHESIVE REFRACTORY PROTECTIVE COMPOSITION FOR INVESTMENT CASTING

This invention relates to an adhesive composition useful in investment casting, particularly in the preparation of metal dental devices. For example, in casting alloys in the preparation of partial dentures, it is customary to make a pattern or model of that part of the dentition and mouth cavity to which the dental device would be attached, called a refractory cast or model. This cast or model is usually made from gypsum, phosphate, or silica-bonded investment. The size and shape of the prospective dental device is determined by adding wax or plastic preforms to the surface of the refractory cast. Heretofore an adhesive such as rosin or special glue in a suitable volatile solvent is applied to the surface of the refractory cast to secure the preforms thereto. Then a protective coat, such as silica-bonded zirconia or quartz may be applied over the surface of the model to provide an inner liner in the investment mold against which the metal is cast. A shell mold may then be built up in multiple layers from a slurry of refractory material in the conventional manner. Also the mold may be prepared by backing up with an investment slurry directly over the wax or plastic model, the protective coat or a previously formed shell mold. The pattern or model is removed by melting or burning out, whereupon molten metal may be cast into the mold thus produced.

The currently-used silica bonded investments are subject to cracking on setting or drying, and tend to liquefy when contacted by molten alloy being cast against the investment. This results in investing mold surface roughness and corrosion. In addition, lower investing mold permeability to hot gases and vaporized alloy constituents generated in metal casting results from this liquefaction. This reduced investment permeability causes excessive porosity in the dental casting leading to poor strength.

The adhesive composition of this invention is useful both as a tacky adhesive for securing wax or plastic preforms to a pattern or model and as a liner or protective coat on the inner surface of an investment mold. Coatings commonly used at the present time are not highly refractory. Currently used rosin or wax dips of the refractory cast do not provide a sufficiently adhesive or tacky surface for the attachment of dead waxes or plastic preforms. Adhesive coatings or glues commonly used to supplement rosin or wax dips, are applied to the refractory cast and are not at present refractory, and their tack deteriorates rapidly. These coatings such as rosin or wax dips have little affinity for the refractory slurry from which the casting mold is prepared. In contrast, the adhesive composition of the invention is characterized by excellent non-deteriorative or indefinitely prolonged tack and provides on burnout, a refractory protective coat as an inner mold liner. At the same time it is possible, with care, to lift off a preform without removing the adhesive film. Furthermore, the adhesive coating is phobic to ethanol, acetone and other polar solvents and may be used to protect wax and other plastic forms from solvent attack. It is also capable of wetting or adhering to dip coat slip mixtures for preparing shell castings in which case it serves as an intermediate bonding agent between the dip coat and the wax or plastic on the model.

The composition of the invention also has important qualities when used as a protective coating forming the inner surface of an investment mold because it is highly refractory and does not liquefy. The adhesive composition as a coating for refractory casts prevents scale formation, reduces casting roughness and resists cracking upon setting or drying. In casting alloys, it eliminates the effects of thermal and corrosive investment liquefaction. This is an important advantage because interfacial liquefaction may result in reduced investment permeability to hot gases at high pressure generated by the casting process. If these gases do not escape rapidly enough from the mold, metal castings of high porosity and reduced strength result. In addition, interfacial liquefaction may result in sufficient differential microdensification in the investment to cause anisotropic mold deformation resulting in warped castings of poor fit.

The compositions of the invention consist essentially of an organic solvent solution of an organic acid soap or salt, the cation of which is a metal taken from the group consisting of zirconium and/or cobalt and having dispersed therein very fine granules of a refractory ceramic material. A preferred composition is a salt solution of zirconium octoate in methylene chloride having dispersed refractory granules of zirconium orthosilicate (zircon). The anion portion of the salts are the usual carboxylic groups of organic acids having from 3–10 C atoms.

The salt or soap is prepared in an organic solvent solution preferably methylene chloride, the soap comprising from 40–70%, preferably about 60% by weight of the solution. To the solution is added refractory granules such as refractory metal oxides or silicates to form a slurry comprising from 40–60% by weight of the refractory granules. The granules should be of very fine particle size preferably less than 5 microns but not greater than 100 microns. In a preferred formulation zircon granules are used having a majority of particles of a size in the range of 2–5 microns mean diameter. The refractory granules may be metal silicates, aluminates, oxides and alumino-silicates. The metals may be tungsten, molybdenum, tantalum, hafnium, thorium and similar metals. The addition of the refractory oxide, silicate or the like prohibits or restricts interfacial liquefaction and corrosion resulting from contact of the coating with the molten casting metal.

In addition to methylene chloride, higher alcohols may be used as the solvent for the refractory soap, for example, butanol, pentanol, hexanol.

It is important that the coating composition of the invention be applied to the refractory cast or the wax or plastic preform in a very thin coat not more than 20 microns, preferably about 10 microns. If the coating is too thick, it will induce blistering and pits on the casting surface. This thin coat should be applied by dipping. Brushing the slurry or pouring it over the surface to be coated is not a satisfactory method of application.

EXAMPLE I

A coating slip was initially prepared by precipitation of zirconium octoate from a 350 ml sample of a 22% mineral spirits solution (22% $ZrO_2$) by repeated absolute ethanol rinses. The salt obtained by precipitation, which resembles a white taffy, was dissolved in 350 ml of methylene chloride. This solution contained about 60% of zirconium octoate (30% $ZrO_2$). To the solution was added 600 grams of precision casting grade zircon having a particle size of from 2 to 5 microns. The slurry was mixed by repeated pouring back and forth between two polyethylene containers. A Ticonium refractory cast, consisting of a gypsum-quartz investment material (Investic) of a partial denture was dipped into the slurry to coat one half the surface and then permitted to dry for about 30 minutes before application of plastic or wax preforms. Plastic preforms may be lifted off the refractory coated models with care. Engineered plastic and wax patterns may be dipped again in the coating mixture. Excess coat must be knifed around the edges of the pattern in order to eliminate fin formation in the final cast part. Outer investment was then applied and normal burn out and alloy casting was executed.

A "low fusing" chromium base alloy which fuses below 1400°C was melted and injected centrifugally into the casting investment. Subsequently, the resulting casting and its surrounding investment was let to cool on standing to room temperature. The resulting metal casting was knocked free of surrounding investment with a hammer and then sandblasted to eliminate adhering investment and scale. Comparative profilometer measurements were made over the sandblasted partial denture casting surface with and without the coating of the invention. The average center of line values (CTA) were measured and their significance computed. On the outer investment side, the CTA value was 1.351±0.123 microns for the surface which was cast against the coating of the invention. The CTA value for a surface cast against the investment was 2.002±0.127. Profilometer values on the refractory-cast casting side was the same for both the coated and uncoated areas, 1.880 microns. Prior to sandblasting the surface cast against the coating was shiny and showed no sign of scaling. This was in contrast to the surface cast directly against the investment which was a dull gray and exhibited abundant scaling. The absence of scaling, when the coat of this invention is used, is due to the fact that the zircon - zirconium octoate composition after burnout does not liquefy during the casting and thus react with oxides and suboxides of vaporized casted alloy constituents. Thermal and corrosive effects which have been observed by petrographic examination of spent gypsum, phosphate and silica bonded investments and currently marketed protective coats were not present when the composition of this invention is employed as a protective coating.

EXAMPLE II

The zirconium octoate solution of Example I was replaced in the amount of 50% by a methylene chloride solution of cobalt octoate. The cobalt octoate improved the flux capability of the coating although the refractoriness of the coating was reduced. The improved flux capability of the cobalt octoate addition aides in the adherence of the invented protective coat to the investment both during and after burnout, thus reducing the chance of spalling into the mold.

EXAMPLE III

Partial denture plates were made from Ticonium plastic triforms using a single dip of the composition of Example I as an adhesive coat on the refractory cast. Two castings were made from the low fusing chromium-nickel-base alloy which fuses below 1400°C and investing technique and three were made from the high fusing chromium-cobaltbase alloy which fuses above 1440°C and phosphate bonded investment. In all castings high detail resolution and nearly complete scale removal were effected.

What is claimed is:

1. An organic solvent dispersion useful in investment casting to secure preforms to a pattern comprising methylene chloride having dissolved therein zirconium octoate, said solution having dispersed therein very fine granules of a refractory material having a particle size predominately in the range of 2–5 microns mean diameter, said zirconium octoate comprising 20–40% by weight of the dispersion.

2. The solvent dispersion of claim 1 wherein zircon granules is said refractory material.

3. The solvent solution of claim 2 in which the zircon granules comprise from 40–60% by weight of the weight of the dispersion.

4. The solvent solution of claim 1 which also includes cobalt octoate.

5. In a method for making an investment mold for casting metal objects from a refractory casting utilizing wax or plastic preforms, the improvement which comprises:
   a. providing a refractory casting,
   b. dipping said casting in a slurry of zircon granules dispersed in a solution of zirconium octoate and methylene chloride said octoate comprising 20–40% by weight of the slurry to provide a thin tacky film on the casting, having a thickness of not more than 20 microns,
   c. applying wax or plastic preforms to the tacky film to produce a model of precisely the desired shape,
   d. repeating the dipping step of step b,
   e. applying an outer ceramic investment to the coated casting, and
   f. burning out the casting to provide an investment mold having a liner of less than 20 microns in thickness.

6. The method according to claim 5 wherein the resultant liner has a thickness of about 10 microns.

* * * * *